(12) United States Patent
Keeton et al.

(10) Patent No.: US 7,644,249 B2
(45) Date of Patent: Jan. 5, 2010

(54) METHOD OF DESIGNING STORAGE SYSTEM

(75) Inventors: Kimberly Keeton, San Francisco, CA (US); John Wilkes, Palo Alto, CA (US); Cipriano A. Santos, Modesto, CA (US); Dirk Beyer, Walnut Creek, CA (US); Jeffrey Scott Chase, Durham, NC (US); Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1211 days.

(21) Appl. No.: 10/943,732

(22) Filed: Sep. 17, 2004

(65) Prior Publication Data

US 2005/0102547 A1 May 12, 2005

Related U.S. Application Data

(60) Provisional application No. 60/504,230, filed on Sep. 19, 2003.

(51) Int. Cl.
*G06F 12/00* (2006.01)

(52) U.S. Cl. .................. 711/170; 711/171; 711/172; 714/1

(58) Field of Classification Search ......... 711/170–173; 714/1
See application file for complete search history.

(56) References Cited

U.S. PATENT DOCUMENTS

| | | | |
|---|---|---|---|
| 5,428,712 A | 6/1995 | Elad | |
| 6,219,650 B1 | 4/2001 | Friend | |
| 6,321,317 B1 * | 11/2001 | Borowsky et al. | 711/170 |
| 6,366,931 B1 | 4/2002 | Borowsky et al. | |
| 6,526,420 B2 | 2/2003 | Borowsky et al. | |
| 2005/0066239 A1 | 3/2005 | Keeton | |
| 2005/0144114 A1 | 6/2005 | Ruggieri | |

OTHER PUBLICATIONS

Manish Malhotra et al: "Reliability analysis of redundant arrays of inexpensive disks", Journal of parallel and distributed computing elsevier, amsterdam, NL, vol. 17, No. 1/2.

Geist R et al: "An analytic treatment of the reliabity and performance of mirrored disk subsystems" Fault-Tolerant Comuting, 1993, FTCS-23 Digest of papers. Jun. 22, 1993.

Schulze M et al: "How reliable is a Raid?", Intellectual leverage, SF Feb. 27-Mar. 3, 1989, computer societyinternational conference (compcon), Washington, Ieee comp. Feb. 27, 1989.

U.S. Appl. No. 10/944,321, filed Sep. 17, 2004, Configuration System and Method.

Alvarez, G. A., et al., Minerva: an automated resource provisioning tool for large-scale storage systems, HP Labs, Palo Alto, CA, 2001.

Anderson, E., et al., Ergastulum: quickly finding near-optimal storage system designs, HP Labs, Palo Alto, CA, 2001.

Anderson, E., et al., Hippodrome: running circles around storage administration, Conference on File and Storage Technologies (FAST'02), pp. 175-188, Monterey, CA, Jan. 28-30, 2002, USENIX, Berkeley, CA.

Avizienis, A., et al., Fundamental Concepts of Dependability, UCLA, Los Angeles, CA, 2000.

(Continued)

*Primary Examiner*—Jasmine Song

(57) ABSTRACT

An embodiment of a method of designing a storage system begins with a step of assigning decision variables to a range of candidate storage systems. Each of the decision variables identifies a single candidate storage system. The method concludes with a step of employing the decision variables in a mathematical program to determine which of the candidate storage systems meets availability and reliability criteria and incurs a near minimal projected cost.

41 Claims, 12 Drawing Sheets

OTHER PUBLICATIONS

Brown, A. and Patterson, D. A., Towards Availability Benchmarks: A Case Study of Software RAID Systems, Proceedings of 2000 USENIX Annual Technical Conference, San Diego, CA, Jun. 18-23, 2000, USENIX, Berkeley, CA.

Classes of Recovery, CNT, Minneapolis, MN, 2003.

Ji, M., et al., Seneca: remote mirroring done write, Proceedings of USENIX Technical Conference, San Antonio, TX, pp. 253-268, Jun. 2003, USENIX, Berkeley, CA.

Keeton, K. and Wilkes, J., Automating data dependability, HP Labs, Palo Alto, CA, Sep. 22, 2002.

Keeton, K. and Wilkes, J., Automatic design of dependable data storage systems, HP Labs, Palo Alto, CA, May 30, 2003.

Keeton, K., et al., Designing for disasters, HP Labs, Palo Alto, CA, Mar. 2004.

Siewiorek, D. P. and Swarz, R. S., Reliable Computer Systems Design and Evaluation, Third Edition, A K Peters, Ltd., Natick, MA, 1998.

Tang, D., et al., Automatic Generation of Availability Models in RAScad, Proceedings of the International Conference on Dependable Systems and Networks (DSN'02), IEEE, 2002.

Wilkes, J. and Stata, R., Specifying data availability in mult-device file systems, Technical Report HPL-CSP-90-6, HP Labs, Palo Alto, CA, Apr. 1, 1990.

Wilkes, J., Traveling to Rome: QoS specifications for automated storage system management, Proceedings of the International Workshop on Quality of Service (IWQoS), Karlsruhe, Germany, Jun. 2001.

Wylie, J. J., et al., Selecting the Right Data Distribution Scheme for a Survivable Storage System, Report CMU-CS-01-120, Carnegie Mellon University, Pittsburgh, PA, May 2001.

U.S. Appl. No. 10/944,321, Office Action dated Jan. 14, 2008, pp. 1-26 and attachments.

U.S. Appl. No. 10/944,321, Final Rejection dated Aug. 1, 2008, pp. 1-27 and attachments.

U.S. Appl. No. 10/944,321, Office Action dated Apr. 29, 2009, pp. 1-18 and attachments.

Disaster Recovery Strategies with Tivoli storage management, 2nd Edition, Nov. 2002, pp. 3-7, 9, 37, 44-47, 307, and 310-312.

* cited by examiner

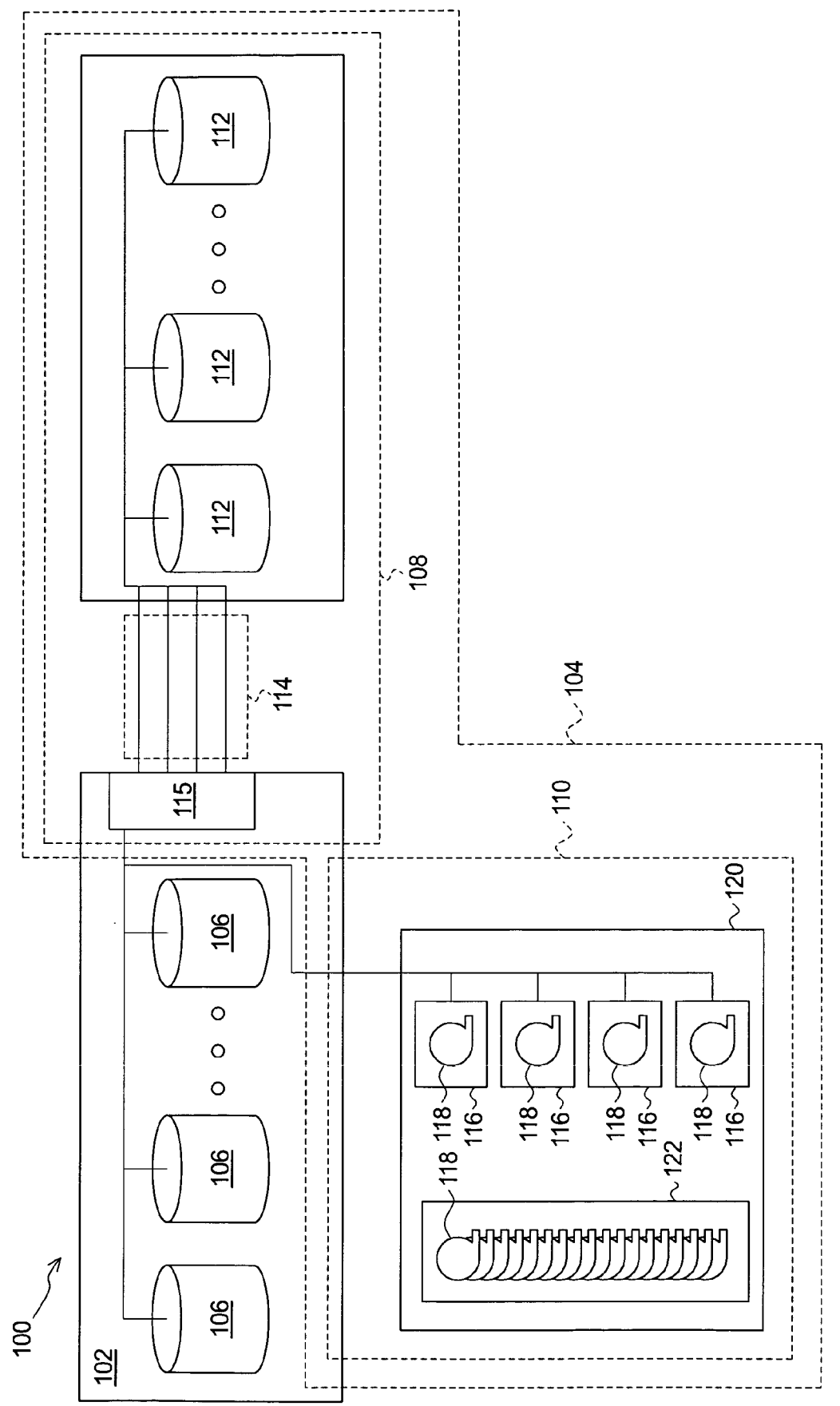

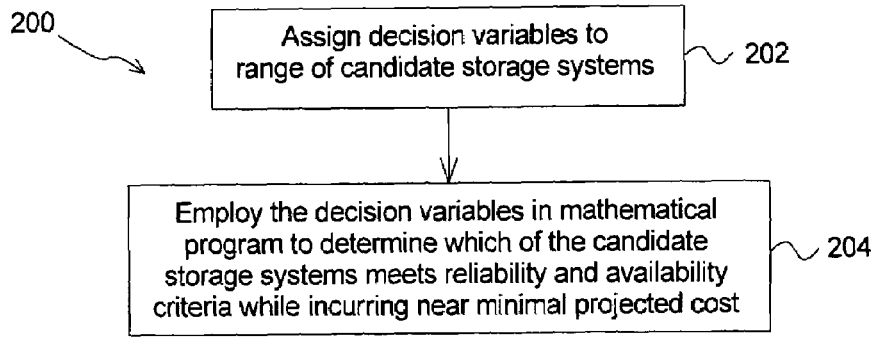

FIG. 2

| Table 1 | |
|---|---|
| Sets of Discrete Variables | |
| Description | Set |
| Remote mirroring types | $m \in M = \{sync, async, asyncB\}$ |
| Time interval types | $w \in W = \{1min, 5min, 1hr, 4hr, 12hr, 24hr, 48hr\}$ |
| Backup cycle types | $k \in K = \{cycle0, cycle6, cycle13, cycle27\}$ |
| Status types of spare resources | $s \in S = \{hot, unconfig, occupied, occUnconfig, none\}$ |
| Failure scopes | $f \in FailureScopes = \{array, site\}$ |

FIG. 3

| Table 2 | | |
|---|---|---|
| Business Requirements Parameters | | |
| Description | Parameter | Units |
| Target recovery time objective | $targetRTO$ | sec |
| Target recovery point objective | $targetRPO$ | sec |
| Outage penalty rate for RTO violation | $p^{unavail}$ | $/sec |
| Loss penalty rate for RPO violation | $p^{loss}$ | $/sec |

FIG. 4

| Table 3 |||
|---|---|---|
| Workload Parameters |||
| Description | Parameter | Units |
| Workload data object capacity | wkldCapacity | bytes (B) |
| Average update rate; no rewrite absorption | avgUpdateRate | B/sec |
| Short-term burst update-rate multiplier | burstMultiplier | multiplier |
| Unique update rate over duration of a window, after absorbing overwrites | $< duration_w, uniqueUpdateRate_w >$ | < sec, B/sec > |

FIG. 5

| Table 4 |||
|---|---|---|
| Disk Array Parameters |||
| Description | Parameter | Units |
| Maximum number of disks in each array | maxDisks | qty |
| Capacity per disk drive | diskCapacity | bytes |
| Maximum disk array reload rate | arrayReloadBW | B/sec |
| Outlay cost of disk array enclosure | enclosureCost | $/enclosure |
| Outlay cost of disk | diskCost | $/disk |
| Fixed outlay cost for facilities | fixedFacilitiesCost | $/yr |
| Variable outlay cost for facilities | varFacilitiesCost | $/B/yr |
| Depreciation period | depreciationPeriod | yr |

FIG. 6

| Table 5 |||
|---|---|---|
| Remote Mirroring Parameters |||
| Description | Parameter | Units |
| Buffer size | mirrorCacheCapacity | bytes |
| Type of asynch. batch window | $w(M) \in W(M) \subset W = \{1min, 5min, 1hr, 4hr, 12hr, 24hr\}$ | time |
| Link bandwidth | linkBW | B/sec |
| Upper bound on no. of links | linksMax | qty |
| Outlay cost per network link | linkCost | $/yr |

FIG. 8

$$arrayCapacity = maxDisks * diskCapacity$$

$$numDiskArrays = 2 * \left\lceil \frac{wkldCapacity}{arrayCapacity} \right\rceil$$

$$numDisks = 2 * \left\lceil \frac{wkldCapacity}{diskCapacity} \right\rceil$$

$$primaryCost = \frac{\binom{numDiskArrays \times enclosureCost}{+ numDisks \times diskCost}}{depreciationPeriod} + 2 * varFacilitiesCost \times wkldCapacity + fixedFacilitiesCost$$

FIG. 7

$$linksMin_{sync} = \left\lceil \frac{avgUpdateRate * burstMultiplier}{linkBW} \right\rceil$$

$$dataLoss_{sync,f} = 0$$

FIG. 9A $$linksMin_{async} = \left\lceil \frac{avgUpdateRate}{linkBW} \right\rceil$$

$$dataLoss_{async,f} = \frac{mirrorCacheCapacity * numDiskArrays}{avgUpdateRate}$$

FIG. 9B $$linksMin_{asyncB,w(M)} = \left\lceil \frac{uniqueUpdateRate_{w(M)}}{linkBW} \right\rceil$$

$$dataLoss_{asyncB,w(M),f} = 2 * duration_{w(M)}$$

FIG. 9C

| Table 6 |||
|---|---|---|
| Tape Backup Parameters |||
| Description | Parameter | Units |
| Tape capacity | *tapeCapacity* | bytes |
| Tape drive rate | *tapeDriveBW* | B/sec |
| Maximum number of drives in library | *tapeDrivesMax* | qty |
| Maximum number of tapes in library | *tapesMax* | qty |
| Type of full backup window | $w(F) \in W(F) \subset W = \{4hr, 12hr, 24hr, 48hr\}$ | time |
| Type of incremental backup window | $w(I) \in W(I) \subset W = \{4hr, 12hr, 24hr, 48hr\}$ | time |
| Number of incrementals in a cycle | $cycleCount_k \in \{0, 6, 13, 27\}$ | qty |
| Time to retrieve tapes from offsite vault | $RT_{vault}$ | sec |
| Outlay cost for tape library | *tapeLibraryCost* | $/library |
| Outlay cost for a tape drive | *tapeDriveCost* | $/drive |
| Outlay cost for tape cartridge | *tapeCost* | $/tape |
| Fixed outlay for tape vault | *fixedVaultCost* | $/yr |
| Outlay cost for a shipment to tape vault | *vaultPerShipmentCost* | $/shipment |
| Number of shipments to vault per year | *numVaultShipments* | qty/yr |

FIG. 10

| Table 7 |||
|---|---|---|
| Spare Resource Parameters |||
| Description | Parameter | Units |
| Time to identify that spare resources are available | $t_{identify}$ | sec |
| Time to configure spare resources | $t_{configure}$ | sec |
| Time to scrub spare resources | $t_{scrub}$ | sec |
| Time to negotiate spare resources | $t_{negotiate}$ | sec |
| Outlay cost of spare disk array storage and facilities | *spareCost* | $/yr |
| Discount factor for shared resources, fraction | *spareDiscount* | [0, 1] |

FIG. 13

$$tapeDrivesMin_{k,w(F),w(I)} = Max\left(tapeDrivesMinFull_{w(F)}, tapeDrivesMinIncr_{k,w(F),w(I)}\right)$$

$$tapeDrivesMinFull_{w(F)} = \left\lceil \frac{wkldCapacity}{duration_{w(F)} * tapeDriveBW} \right\rceil$$

$$tapeDrivesMinIncr_{k,w(F),w(I)} = \left\lceil \frac{uniqueCapacity_{w(F)} + (cycleCount_k - 1) * uniqueCapacity_{w(I)}}{duration_{w(I)} * tapeDriveBW} \right\rceil$$

$$numTapes_{k,w(F),w(I)} = 4 * numTapesFull + numTapesIncr_{k,w(F),w(I)}$$

$$numTapesFull = \left\lceil \frac{wkldCapacity}{tapeCapacity} \right\rceil \qquad numTapesArrayFull = \left\lceil \frac{numTapesFull}{numDiskArrays} \right\rceil$$

$$numTapesIncr_{k,w(F),w(I)} = \sum_{i=0}^{cycleCount(k)-1} \left\lceil sizeOfIncr_i / tapeCapacity \right\rceil$$

where $sizeOfIncr_i = uniqueCapacity_{w(F)} + i * uniqueCapacity_{w(I)}$ $$numTapesMaxIncr_{k,w(F),w(I)} = \left\lceil \frac{uniqueCapacity_{w(F)} + (cycleCount_k - 1) * uniqueCapacity_{w(I)}}{tapeCapacity} \right\rceil$$

$$numTapesArrayMaxIncr_{k,w(F),w(I)} = \left\lceil \frac{numTapesMaxIncr_{k,w(F),w(I)}}{numDiskArrays} \right\rceil$$

$$dataLoss_{k,w(F),w(I),array} = duration_{w(F)} + duration_{w(I)}$$

$$dataLoss_{k,w(F),w(I),site} = 2 * intervalCycle_k + duration_{w(F)}$$

where $intervalCycle_k = duration_{w(F)} + cycleCount_k * duration_{w(I)}$

FIG. 12

$$RT_{hot} = t_{identify}$$

$$RT_{unconfig} = t_{identify} + t_{configure}$$

$$RT_{occupied} = t_{identify} + t_{scrub} + t_{negotiate}$$

$$RT_{occUnconfig} = t_{identify} + t_{configure} + t_{scrub} + t_{negotiate}$$

$$RT_{none} = t_{order} + t_{configure} + t_{identify}$$

$$O_{hot} = spareCost$$

$$O_{unconfig} = spareCost$$

$$O_{occupied} = spareCost * spareDiscount$$

$$O_{occUnconfig} = spareCost * spareDiscount$$

$$O_{none} = 0$$

FIG. 14

$$recoveryTime_{m,array} = \frac{arrayCapacity}{linkBW} * z_m \qquad m \in \{sync, async\}$$

$$recoveryTime_{m,site} = \frac{wkldCapacity}{linkBW} * z_m \qquad m \in \{sync, async\}$$

$$recoveryTime_{asyncB,w,array} = \frac{arrayCapacity}{linkBW} * z_{asyncB,w} \qquad w \in W(M)$$

$$recoveryTime_{asyncB,w,site} = \frac{wkldCapacity}{linkBW} * z_{asyncB,w} \qquad w \in W(M)$$

FIG. 15

$$recoveryTime_{k,w(F),w(I),array} = \left(\frac{(numTapesArrayFull + numTapesArrayMaxIncr_{k,w(F),w(I)}) * tapeCapacity}{tapeDriveBW}\right) * z_{k,w(F),w(I)}$$

$$\forall [k, w(F), w(I)]$$

$$recoveryTime_{k,w(F),w(I),site} = \left(RT_{vault} + \frac{(numTapesArrayFull + numTapesArrayMaxIncr_{k,w(F),w(I)}) * tapeCapacity}{tapeDriveBW}\right) * z_{k,w(F),w(I)}$$

$$\forall [k, w(F), w(I)]$$

FIG. 16

$$p^{unavail} = p^{unavail} \left[ \sum_{f \in FailureScopes} failureLikelihood_f * \left( \sum_{m \in \{sync,async\}} v_{m,f}^{RTO} + \sum_{w \in W(M)} v_{asyncB,w,f}^{RTO} + \sum_{k,w(F),w(I)} v_{k,w(F),w(I),f}^{RTO} \right) \right]$$

$$p^{loss} = p^{loss} \left[ \sum_{f \in FailureScopes} failureLikelihood_f * \left( \sum_{m \in \{sync,async\}} v_{m,f}^{RPO} + \sum_{w \in W(M)} v_{asyncB,w,f}^{RPO} + \sum_{k,w(F),w(I)} v_{k,w(F),w(I),f}^{RPO} \right) \right]$$

FIG. 17

$$O^{mirror} = primaryCost * \left( \sum_{m \in \{sync, async\}} x_m + \sum_{u \in W(M)} x_{async,w} \right) + linkCost * \left( \sum_{m \in \{sync, async\}} y_m + \sum_{u \in W(M)} y_{async,w} \right)$$

$$O^{backup} = \frac{2 * (tapeLibraryCost \sum_{k,w(F),w(I)} u_{k,w(F),w(I)} + tapeDriveCost \sum_{k,w(F),w(I)} y_{k,w(F),w(I)})}{depreciationPeriod}$$

$$+ \frac{diskCost}{diskCapacity * depreciationPeriod} * \sum_{k,w(F),w(I)} (wkldCapacity + uniqueCapacity_{w(F)}) * x_{k,w(F),w(I)}$$

$$+ tapeCost \sum_{k,w(F),w(I)} numTapes_{k,w(F),w(I)} * x_{k,w(F),w(I)} + fixedVaultCost + vaultPerShipmentCost * numVaultShipments$$

$$O^{spare} = \sum_{s \in S} O_s * x_s$$

FIG. 18

$$1902 \rightarrow \sum_{m \in \{sync, async\}} x_m + \sum_{w \in W(M)} x_{asyncB,w} + \sum_{k,w(F),w(I)} x_{k,w(F),w(I)} = 1 \quad k \in K, w(F) \in W(F), w(I) \in W(I)$$

$$1904 \rightarrow \sum_{s \in S} x_s = 1$$

$$1906 \begin{cases} linksMin_m * x_m \leq linksMax * x_m \quad m \in \{sync, async\} \\ linksMin_{asyncB,w} * x_{asyncB,w} \leq linksMax * x_{asyncB,w} \quad w \in W(M) \\ tapeDrivesMin_{k,w(F),w(I)} * x_{k,w(F),w(I)} \leq y_{k,w(F),w(I)} \leq tapeDrivesMax * u_{k,w(F),w(I)} \\ \qquad k \in K, w(F) \in W(F), w(I) \in W(I) \\ u_{k,w(F),w(I)} \geq y_{k,w(F),w(I)} / tapesDrivesMax \\ u_{k,w(F),w(I)} \geq \left( numTapes_{k,w(F),w(I)} / tapesMax \right) * x_{k,w(F),w(I)} \end{cases}$$

$$1908 \begin{cases} linkBW * y_m \leq arrayReloadBW * numDiskArrays \quad m \in \{sync, async\} \\ linkBW * y_{asyncB,w} \leq arrayReloadBW * numDiskArrays \quad w \in W(M) \\ tapeDriveBW * y_{k,w(F),w(I)} \leq arrayReloadBW * numDiskArrays \quad k \in K, w(F) \in W(F), w(I) \in W(I) \end{cases}$$

FIG. 19A $$\left.\begin{array}{l}\left(recoveryTime_{m,f}+recoveryTime_{spares}\right)-v_{m,f}^{RTO} \leq targetRTO+(1-x_m)*C \\ \quad m\in\{sync,async\} \text{ and } f\in failureScopes \\ \left(recoveryTime_{asyncB,w,f}+recoveryTime_{spares}\right)-v_{asyncB,w,f}^{RTO} \leq targetRTO+(1-x_{asyncB,w})*C \\ \quad w\in W(M) \text{ and } f\in failureScopes \\ \left(recoveryTime_{k,w(F),w(I),f}+recoveryTime_{spares}\right)-v_{k,w(F),w(I),array}^{RTO} \leq targetRTO+(1-x_{k,w(F),w(I)})*C \\ \quad k\in K, w(F)\in W(F), w(I)\in W(I) \text{ and } f\in FailureScopes \end{array}\right\}\;1910$$

$$\left.\begin{array}{l} dataLoss_{m,f}*x_m - v_{m,f}^{RPO} \leq targetRPO \quad m\in\{sync,async\}, f\in FailureScopes \\ dataLoss_{asyncB,w,f}*x_{asyncB,w} - v_{asyncB,w,f}^{RPO} \leq targetRPO \quad w\in W(M), f\in FailureScopes \\ dataLoss_{k,w(F),w(I),f}*x_{k,w(F),w(I)} - v_{k,w(F),w(I),f}^{RPO} \leq targetRPO \\ \quad k\in K, w(F)\in W(F), w(I)\in W(I) \text{ and } f\in FailureScopes \end{array}\right\}\;1912$$

$$\left.\begin{array}{l} y_\gamma = \sum_{n\in N} y_\gamma^n * \lambda_\gamma^i \\ z_\gamma = \sum_{n\in N} z_\gamma^n * \lambda_\gamma^i \\ \sum_{n\in N} \lambda_\gamma^n = x_\gamma \quad \text{where } \gamma\in\{sync,async,[asyncB,w(M)],[k,w(F),w(I)]\} \end{array}\right\}\;1914$$

FIG. 19B

METHOD OF DESIGNING STORAGE SYSTEM

RELATED APPLICATIONS

This application claims the benefit of U.S. Provisional Patent Application No. 60/504,230, filed on Sep. 19, 2003, which is hereby incorporated by reference in its entirety. This application is related to U.S. application Ser. No. 10/944,321 filed on Sep. 17, 2004 (U.S. Patent Publication No. 2005/0066239).

FIELD OF THE INVENTION

The present invention relates to the field of storage system design. More particularly, the present invention relates to the field of storage system design in which dependability is a design criterion.

BACKGROUND OF THE INVENTION

In a typical enterprise storage system, storage servers couple to a plurality of disk arrays via a SAN (storage area network). The storage servers write and read data from the disk arrays in response to requests from clients. Typically, each disk array comprises a plurality of disk drives and at least two controllers. Many disk arrays include a hot swappable feature, which upon failure of a disk drive or a controller allows replacement of the failed component without interrupting operation of remaining components. Often, the disk arrays employ a RAID (redundant array of independent disks) technique to mirror data or create parity data so that a failed disk drive does not lead to loss of data within the disk array.

Numerous techniques are available for protecting against a disk array failure or a site failure. These include backup and inter-array mirroring techniques. Backup techniques include local backup, local backup with remote vault storage, and remote backup. Backup techniques may employ tape backup or backup to a disk media. Backups may be full backups or a combination of full backups and incremental backups or some other backups such as compressed deltas. Backup techniques may employ space-efficient snapshots or split-mirrors/clones. Inter-array mirroring techniques include local mirroring and remote mirroring. Remote mirroring can range from locating a secondary storage in an adjacent building to locating the secondary storage on another continent. Remote mirroring may employ synchronous mirroring, asynchronous mirroring, or batched asynchronous mirroring. Both backup and mirroring techniques require setting numerous parameters.

Backup and mirroring may also be used in other storage systems such as workgroup storage systems and storage systems for desktop computers. Unfortunately, within even a single data protection technique such as backup or mirroring, the range of available configurations and options is large.

Storage systems have been designed and built which employ backup or mirroring to provide some assurance of dependability. The typical design practice looks to a previous design which addresses a similar size and class of storage system to find a base design and then possibly adjusts some parameters using rules of thumb to tailor the design for the particular application. This design process often results in a design that is not as dependable as what is desired or that is significantly over-provisioned. It would be much more desirable to employ a design process that designs a storage system to meet dependability criteria.

What is needed is a method of designing a storage system which meets dependability criteria.

SUMMARY OF THE INVENTION

The present invention comprises a method of designing a storage system. According to an embodiment the method begins with a step of assigning decision variables to a range of candidate storage systems. Each of the decision variables identifies a single candidate storage system. The method concludes with a step of employing the decision variables in a mathematical program to determine which of the candidate storage systems meets availability and reliability criteria and incurs a near minimal projected cost.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 1 schematically illustrates an embodiment of a range of candidate storage systems for an enterprise environment which are modeled as decision variables for an embodiment of a method of designing a storage system of the present invention;

FIG. 2 illustrates an embodiment of a method of designing a storage system of the present invention as a flow chart;

FIG. 3 provides a table of sets of discrete variables according to an exemplary embodiment of a mixed integer program of the present invention;

FIG. 4 provides a table of business requirements parameters according to an exemplary embodiment of a mixed integer program of the present invention;

FIG. 5 provides a table of workload parameters according to an exemplary embodiment of a mixed integer program of the present invention;

FIG. 6 provides a table of disk array parameters according to an exemplary embodiment of a mixed integer program of the present invention;

FIG. 7 provides an embodiment of equations for derived disk array parameters according to an exemplary embodiment of a mixed integer program of the present invention;

FIG. 8 provides a table of remote mirroring parameters according to an exemplary embodiment of a mixed integer program of the present invention;

FIGS. 9A, 9B, and 9C provide an embodiment of equations for derived remote mirroring parameters according to an exemplary embodiment of a mixed integer program of the present invention;

FIG. 10 provides a table of tape backup parameters according to an exemplary embodiment of a mixed integer program of the present invention;

FIG. 12 provides an embodiment of equations for derived parameters for tape backup according to an exemplary embodiment of a mixed integer program of the present invention;

FIG. 13 provides a table of spare resource parameters according to an exemplary embodiment of a mixed integer program of the present invention;

FIG. 14 provides an embodiment of equations for derived parameters for spare resources options according to an exemplary embodiment of a mixed integer program of the present invention;

FIG. 15 provides an embodiment of equations for derived variables for remote mirroring according to an exemplary embodiment of a mixed integer program of the present invention;

FIG. 16 provides an embodiment of equations for derived variables for tape backup according to an exemplary embodiment of a mixed integer program of the present invention;

FIG. 17 provides an embodiment of equations for derived variables for penalty costs according to an exemplary embodiment of a mixed integer program of the present invention;

FIG. 18 provides an embodiment of equations for derived variables for outlay costs according to an exemplary embodiment of a mixed integer program of the present invention; and FIGS. 19A and 19B provide an embodiment of equations for constraints according to an exemplary embodiment of a mixed integer program of the present invention.

DETAILED DESCRIPTION OF A PREFERRED EMBODIMENT

Figure 11:
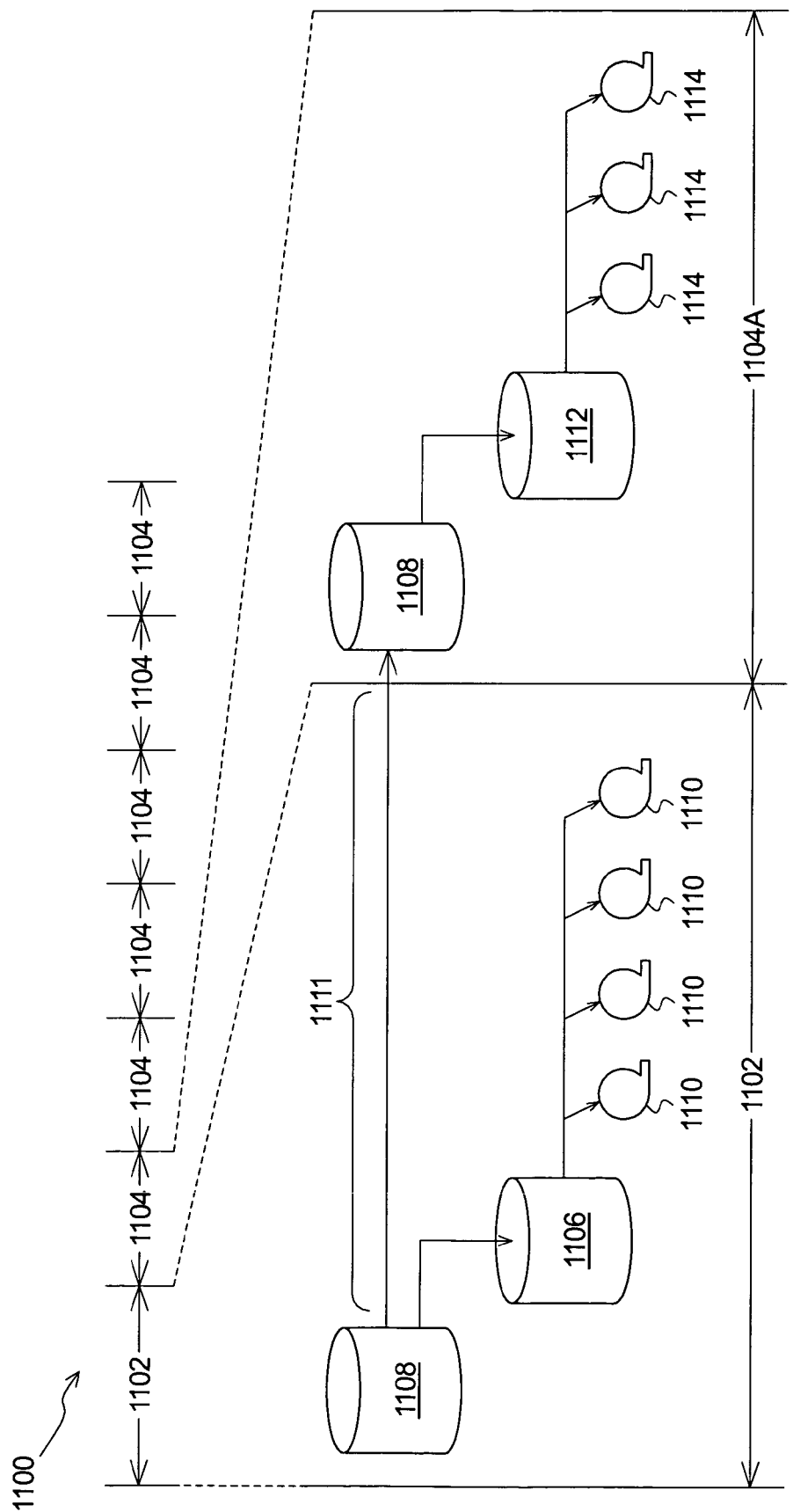
FIG. 11 schematically illustrates an embodiment of a weekly backup cycle of a full backup followed by six incremental backups.

The present invention comprises a method of designing a storage system which meets dependability criteria (i.e., availability and reliability). In an embodiment, the method is employed to design an enterprise storage system. In other embodiments, the method is employed to design other dependable storage systems such as a workgroup dependable storage system or a dependable storage system for a desktop computer.

An embodiment of a range of candidate storage systems for an enterprise environment is illustrated schematically in FIG. 1. The candidate storage systems 100 each comprise a primary storage 102 and a particular secondary storage selected from a range of secondary storage systems 104 as well as a secondary storage technique and, if appropriate, configuration parameters for the secondary storage technique. In the enterprise environment, the primary storage 102 typically comprises disk arrays 106. Typically, each disk array 106 comprises a plurality of disks drives (not shown) and two controllers (not shown), which are hot swappable. The hot swappable feature allows a disk drive or a controller to be replaced without powering down the disk array 106 and without interfering with the operation of the remaining components within the disk array 106. Often the disk arrays 106 employ a RAID (redundant array of independent disks) technique such as RAID 5 or RAID 10 to protect against a failure of one or more of the disk drives.

The range of secondary storage systems 104 comprises remote mirror configurations 108 and local backup configurations 110. Alternatively, the range of secondary storage systems 104 comprise mirror configurations, which include local and remote mirror configurations, and backup configurations, which include local and remote backups. Typically, the remote mirror configurations 108 employ disk arrays 112 which mirror the disk arrays 106. However, the disk arrays 112 may require less storage than the disk arrays 106 if the disk arrays 112 employ a RAID technique which uses less disk space than the RAID technique used for the disk arrays 106. For example, if the disk arrays 106 employ RAID 10 (i.e., a mirroring technique) and the disk arrays 112 employ RAID 5 (i.e., a parity technique), less of the disk arrays 112 will be required to store an amount of data stored in the disk arrays 106. One or more network links 114 couple the primary storage 102 to the disk arrays 112. The one or more network links 114 provide bandwidth for storage traffic (i.e., a workload) to the disk arrays 112. The amount of bandwidth needed depends upon the workload and the particular remote mirroring technique that is employed.

Remote mirroring techniques which may be used include synchronous mirroring, asynchronous mirroring, and batched asynchronous mirroring. In the synchronous mirroring, a write operation completes successfully when data is stored on both the primary storage 102 and a remote mirror. For good performance, this technique requires high bandwidth from the primary storage 102 to the remote mirror and low latency (i.e., small delay) between the primary storage 102 and the remote mirror. In the asynchronous mirroring, data is written to the remote mirror in the order that it is written to the primary storage 102 but some time may elapse between completion of the write operation to the primary storage 102 and completion of the write operation to the remote mirror. In this technique, a buffer 115 is employed at the primary storage 102 to smooth the workload to an average workload. In batched asynchronous mirroring, data is collected and transmitted in batches to the remote mirror. The batches are collected over pre-determined time periods. In this technique, if some data is written and then modified within a single time period, only the modified data is transmitted to the remote mirror which conserves the bandwidth from the primary storage 102 to the remote mirror.

Typically, the local backup configurations 110 comprise tape backups, which employ tape drives 116 and tapes 118 to make backups. Alternatively, the local backup may employ another type of storage such as disk storage. The tape drives 116 and the tapes 118 may be arranged in one or more tape libraries 120 which include a rack 122 for holding at least a portion of the tapes 118 and a mechanism (not shown) for moving the tapes 118 between the rack 122 and the tape drives 116. Often, the backups are made by taking a snapshot or freezing an image of a storage volume and then copying the snapshot or the image to one or more tapes. Alternatively, the backup can be made by freezing the storage volume itself and copying the storage volume directly to the backups. For the local backup configurations 110, the tape drives 116 provide bandwidth for making the backups from the snapshot or the image. For example, if each of the tape drives 116 record data at the same rate, four of the tape drives 116 provide twice as much bandwidth as two of the tape drives 116.

The backups may be full backups or incremental backups. Alternatively, the backups may be some other type of backups such as compressed deltas. A full backup is a copy of an entire data set. The incremental backups may be cumulative incremental backups or differential incremental backups. A cumulative incremental backup copies data modified since a most recent full backup. A differential incremental backup copies data modified since a most recent backup of any kind. If the backups are local backups, remote vaulting may be included to cover a site failure. Remote vaulting is a practice of periodically sending at least some of the backups (e.g., the full backups) to a remote vault site.

An embodiment of a method of designing a storage system of the present invention is illustrated as a flow chart in FIG. 2. The method of FIG. 2 is performed by computer code executable by a computer. The method 200 begins with a first step 202 of assigning decision variables to a range of candidate storage systems. Each of the decision variables identifies a single candidate storage system. The method 200 concludes with a second step 204 of employing the decision variables in a mathematical program to determine which of the candidate storage systems meets availability and reliability criteria while incurring a near minimal projected cost. Availability is a measure of the ability to access data when desired (e.g., recovery time). Reliability is a measure of the absence of data loss or an indicator of an acceptable amount of data loss (e.g., recovery point). The mathematical program comprises constraints and an objective which when solved for a workload provides a particular candidate storage system which provides the near minimal projected cost. While the goal of solving the mathematical program is to find the particular candidate storage system which provides the near minimal projected cost, the solution may in fact yield the minimal projected cost. In other words, in the context of the present invention, the term "near minimal projected cost" includes "minimal projected cost."

Preferably, the mathematical program comprises a mixed integer program in which variables comprise integer variables (i.e., variables which take integer or Boolean values) and continuous variables. Alternatively and much less preferred, the mathematical program comprises another mathematical program such as an integer program or a mathematical program employing only continuous variables.

Note that the terms mathematical program, mixed integer program, and integer program fall within the field of "mathematical programming" in which constraints and an objective model an optimization problem and that when solved lead to a near optimal solution which may in fact be the optimal solution. Generally, mathematical programs are solved using commercially available software packages which are referred to as "solvers." Some solvers are configured to solve mathematical programs written in AMPL, a modeling language for mathematical programming. Some spreadsheets such as Excel include solvers for mathematical programs set up as spreadsheets.

Often, mixed integer programs and integer programs are solved with the goal of finding a near optimal solution rather than the optimal solution. This is because mixed integer programs and integer programs are often NP hard. The term "NP hard" means that an exact solution can only be obtained within a feasible time period for a small problem size. Providing more computing power only slightly increases the problem size for which one can expect to find the exact solution. Thus, when solving an NP hard problem that exceeds the threshold of a small problem size, a solver seeks a near optimal solution rather than the optimal solution. However, nothing prevents the solver from actually selecting the optimal solution. Accordingly, within the context of the present invention a near optimal solution also encompasses the optimal solution.

In an embodiment, the availability and reliability criteria comprise a Recovery Time Objective (RTO) and a Recovery Point Objective (RPO), respectively. The RTO is a time period for recovering from a failure. For example, if a failure occurs at 1 pm and the RTO is 10 minutes, the recovery from the failure should be complete at 1:10 pm. The RPO is a worst case time period for data loss (e.g., recent updates). For example, if the failure occurs at 1 pm and the RPO is 30 minutes, in the worst case, the data will be restored to its state at 12:30 pm upon recovery.

In another embodiment, the availability and reliability criteria comprise the RTO and the RPO which may be relaxed by a recovery time allowance or a recovery point allowance, respectively. The recovery time allowance and the recovery point allowance are variables which the solver assigns values while seeking the near optimal solution. In such an embodiment, the projected cost incurs an RTO penalty cost or an RPO penalty cost or both. The RTO and RPO penalty costs comprise recovery time and recovery point penalty rate functions, respectively. In an embodiment, the RTO penalty cost comprises a product of a likelihood of failure, the recovery time allowance, and a recovery time penalty rate. In another embodiment, the RTO penalty cost comprises a product of the recovery time allowance and the recovery time penalty rate. In an embodiment, the RPO penalty cost comprises a product of the likelihood of failure, the recovery point allowance, and a recovery point penalty rate. In another embodiment, the RPO penalty cost comprises a product of the recovery point allowance times the recovery point penalty rate.

Note that the recovery time penalty rate and the recovery point penalty rate may be constants or may be a function of recovery time or recovery point, respectively. For example, the recovery time penalty rate as a function of recovery time may take a value of $1,000 per second for the first ten minutes of recovery and then may increase to $10,000 per second. Similarly, the recovery point penalty rate as a function of recovery point may take a value of $5,000 per second for the first minute of data loss then may increase to $20,000 per second.

In yet another embodiment, the RTO and RPO are set to zero while the RTO and RPO penalty costs lead to a storage system which has an actual recovery time and an actual recovery point which is higher than zero. Any storage system will have a non-zero recovery time and, therefore, it is not possible to meet an RTO of zero. On the other hand, it is possible to build a storage system which encounters a failure but loses no data. Thus, an RPO of zero can be made a design requirement.

An embodiment of a mixed integer program of the present invention comprises input values, decision variables, constraints, and an objective. In general, the input values include run-time input values and previously entered input values. The run-time input values are values that are specific to a particular user, group, or enterprise. The previously entered input values are more general input values which model a range of candidate storage system.

In any storage environment, the run-time input values preferably include workload input values. In the enterprise environment, the run-time input values may include the RTO and RPO or they may include the RTO, the RPO, the recovery time penalty rate, and the recovery point penalty rate. Alternatively in the enterprise environment, the RTO and RPO might not be entered allowing them to default to some predetermined value such as zero. In other environments, such as for desktop computers, assessing penalty rates may be more difficult than such an assessment in the enterprise environment. Thus, in the other environments, the run-time input values are likely to include the RTO and the RPO but not the recovery time and recovery point penalty rates; though, nothing prevents use of the penalty rates in these environments. At a minimum for any environment, the input values include either the RTO or the recovery time penalty rate and either the RPO or the recovery point penalty rate.

The workload input values comprise a data capacity and a storage update rate. Preferably, the storage update rate is categorized as an average update rate, a burst multiplier, and unique update rates. The product of the average update rate and the burst multiplier provides a peak update rate. The unique update rates are a series of tuples of the form window duration and unique update rate. Alternatively, the storage update rate may be categorized as the average update rate or the peak update rate or the unique update rates.

Preferably, the workload input values should be as specific to the environment as possible. For example, if the secondary storage is being designed for a particular enterprise, the workload input values should model the workload for the particular enterprise. Alternatively, in the absence of workload information for a particular environment, default values may be used. For example, a library of default values may be made available so that at run-time particular default values may be chosen which are expected to model the particular environment.

In general, the previously entered input values include parameters which model the candidate storage systems and failure scenarios. For example, the previously entered input values may include input values which model primary storage, failure scenarios, secondary storage, and spare resources. Of course, these input values may be entered or adjusted at run time just as the run-time input values may have been previously entered.

The primary storage input values comprise capacity of the data storage units, maximum reload rate for the data storage units, and outlay costs for the data storage units.

In general, each of the failure scenarios comprises a failure scope, a threat category, and a failure likelihood. In an embodiment, the failure scope indicates whether the failure affects a component of a disk array, the disk array itself, the primary storage site, or a region which includes the primary storage site. In an embodiment, the threat category indicates whether the failure is a data loss failure or a data corruption failure. In general, the former occurs upon a hardware or site failure. The latter is often caused by defective software, defective firmware, a virus, or a human error. The failure likelihood is the probability of the failure within some time period such as a year.

The secondary storage input values include type or types of secondary storage (e.g., remote mirroring or local backup or both). For remote mirroring, the secondary storage input values preferably include network link bandwidth, and network link cost as well as input values for particular remote mirroring categories such as maximum buffer (i.e., cache) size for asynchronous mirroring and batch window sizes for batched asynchronous mirroring if appropriate. Alternatively, for the remote mirroring, the network link bandwidth may be more generally specified as bandwidth units, and cost for bandwidth units. Alternatively, for the asynchronous batched mirroring, batch window size may be implemented as a continuous variable.

For local backup, the secondary storage input values preferably include local backup categories, tape drive recording rate, tape capacity, and outlay costs for tape drives and tapes as well as input values for the frequency of full backups and the frequency of incremental backups if appropriate. Alternatively, for the local backup, the tape drive recording rate and tape capacity may be more generally specified as bandwidth and capacity characteristics.

For remote backups, the secondary storage input values further include network link bandwidth and network link cost or bandwidth units and cost per bandwidth unit.

The spare resource option input values include times to configure the spare resource options and outlay costs for the spare resource options. The spare resource options may be categorized as a hot resource option, an un-configured resource option, an occupied resource option, and none. The hot resource option maintains resources that are ready to be used. The un-configured resource option means that resources need to be configured. The occupied resource option means that negotiations must take place in order to release resources from other tasks. And "none" indicates that spare resources must be obtained (e.g., purchased or leased) and configured. Some types of spare resources options may be combined such as the occupied and un-configured resource options.

The decision variables model the secondary storage options (i.e, the candidate storage systems), the bandwidth devices (e.g., network links, tape drives and tapes, or bandwidth units), and the spare resources options.

The constraints comprise a secondary storage selection constraint, a spare resource selection constraint, a bandwidth constraint, a reload constraint, a recovery time constraint, and a recovery point constraint.

Preferably, the secondary storage selection constraint requires that one and only one candidate secondary storage system be selected from a range of candidate secondary storage systems. For example, the secondary storage selection constraint may require that a candidate storage system be chosen from a range of remote mirroring configurations or from a range of backup configurations or from a combined range of remote mirroring configurations and backup configurations. Alternatively, the secondary storage selection constraint may require that a candidate storage system be selected from each of a plurality of secondary storage system types. For example, the secondary storage selection constraint may require that a remote mirroring configuration and a local backup configuration be selected.

The spare resource selection constraint requires that one and only one spare resource option be selected from a range of spare resource options.

The bandwidth constraint requires that there is adequate bandwidth to meet the workload. For the remote mirroring, the bandwidth constraint requires that there are sufficient network links or network bandwidth units to meet the workload in the context of the specific remote mirroring configuration selected. For example, for synchronous mirroring, the bandwidth constraint requires that there be adequate bandwidth to handle the average update rate times the burst multiplier. For local backup, the bandwidth constraint requires that there be sufficient backup resources to make the backups within backup time periods (i.e., backup windows). For example, the bandwidth constraint for the local backup may require that there be a sufficient number of tape drives and tapes to make the backups (e.g., full backups or incremental backups or compressed deltas) within the backup windows. Alternatively, the bandwidth constraint for the local backup may require that there be sufficient bandwidth and capacity characteristics to make the backups with the backup windows.

The reload constraint requires that the bandwidth from the secondary storage to the primary storage does not exceed a reload rate for the primary storage.

Preferably, the recovery time constraint comprises not exceeding the RTO. Alternatively, the recovery time constraint comprises not exceeding a sum of the RTO and a recovery time allowance where the recovery time allowance is a variable which is assigned a value by the solver. Alternatively, the recovery time constraint comprises not exceeding the recovery time allowance (i.e., the RTO has a value of zero).

Preferably, the recovery point constraint comprises not exceeding the RPO (e.g., time period for recent data loss). Alternatively, the recovery point constraint comprises not exceeding a sum of the RPO and a recovery point allowance where the recovery point allowance is a variable which is assigned a value by the solver. Alternatively, the recovery point constraint comprises not exceeding the recovery point allowance (i.e., the RPO has a value of zero).

Preferably, the objective comprises minimizing a sum of outlay costs and penalty costs. Alternatively, the objective comprises minimizing a sum of the outlay costs. In an embodiment, the outlay costs comprise the outlay cost for the secondary storage selection and the outlay cost for the spare resource option. In another embodiment, the outlay costs further comprise the outlay cost for the primary storage. The penalty costs comprise a recovery time penalty cost and a recovery point penalty cost. Preferably, the recovery time penalty cost comprises a product of the failure likelihood, the recovery time allowance, and the recovery time penalty rate. Alternatively, the recovery time penalty cost comprises a product of the recovery time allowance and the recovery time penalty rate or some other function. Preferably, the recovery point penalty cost comprises a product of the failure likelihood, the recovery point allowance, and the recovery point penalty rate. Alternatively, the recovery point penalty cost comprises a product of the recovery point allowance and the recovery point penalty rate or some other function. The recovery time penalty rate and the recovery cost penalty rate may be constants or may be functions of recovery time and recovery point, respectively.

According to an embodiment, a series of instantiations of the second step 204 of the method 200 of designing the storage system of the present invention are used to map a solution space (e.g., a three dimensional space). In an embodiment, the solution space comprises recovery time versus recovery point versus outlay cost. In another embodiment, the solution space comprises a recovery time penalty rate function versus a recovery point penalty rate function versus total cost (i.e., sum of outlay costs and penalty costs). In yet another embodiment, the solution space comprises a five dimensional space of recovery time, recovery point, recovery point penalty rate function, recovery point penalty rate function, and total cost. The solution space may depict an entire solution space or a portion thereof.

According to an embodiment, a series of instantiations of the second step 204 are used to identify a number of top performing candidate storage systems.

According to an embodiment, the method 200 of designing the storage system of the present invention is used to design a new storage system. According to another embodiment, the method 200 of designing the storage system of the present invention is used to incrementally improve an existing storage system. According to this embodiment, the actual workload experienced by the existing system is used in the mathematical program to incrementally improve the storage system. When seeking to incrementally improve an existing storage system it may be beneficial to limit the solution space to storage systems which can be readily and efficiently configured. In other words, if the existing storage system uses remote mirroring but not local backup, it may be beneficial to limit the solution space to remote mirror configurations so that at least some of the existing remote mirroring hardware can be utilized and so that local backup hardware need not be purchased and installed.

An exemplary embodiment of a formulation of a mixed integer program of the present invention comprises sets of discrete variables, parameters (i.e., input values), derived parameters, decision variables, derived variables, an objective, and constraints.

The formulation invokes a set of models for data protection and recovery alternatives to explore a solution space—including the ranges of parameter settings for each technique—and to predict outlay costs, worst-case recovery time, and worst-case time period for data loss for each candidate solution. The formulation considers remote mirroring using synchronous, asynchronous, and batched asynchronous protocols, and tape backup with remote vaulting. Recovery is accomplished through reconstructing the lost data at the primary storage site. Each model defines a set of input parameters and their values, a set of output parameters and their ranges of valid settings, and equations relating the parameters to the measures of interest. Different system components may be modeled by supplying different model parameters and new data protection techniques may be incorporated through the addition of new models.

To reduce the solution space, the values of certain continuous parameters, such as backup intervals and the batch intervals for the batched asynchronous remote-mirroring scheme, are quantized. The sets of discrete variables enumerate the quantized values. An embodiment of the sets of discrete variables is provided as table 1 (FIG. 3). The sets of discrete variables comprise remote mirroring types, time interval types, backup cycle types, status types of spare resources, and failure scopes. Alternatively, one or more of the discrete variables may be replaced with continuous variables.

In the exemplary embodiment, the remote mirroring types comprise synchronous mirroring (sync), write-order preserving asynchronous mirroring (async), and batched asynchronous mirroring with write absorption (asyncB). More informally, these remote mirroring types are referred to herein as synchronous mirroring, asynchronous mirroring, and batched asynchronous mirroring, respectively.

The time interval types comprise a range of time intervals or windows used for data protection techniques that accumulate updates over an interval. The time intervals identified in table 1 (FIG. 3) are a particular embodiment of a set of such time intervals.

The backup cycle types comprise a range of backup cycles. The backup cycle types identified in table 1 (FIG. 3) are a particular embodiment of a set of such backup cycles. These include full backups only (cycle0), a full backup followed by 6 incremental backups (cycle6), a full backup followed by 13 incremental backups (cycle13), and a full backup followed by 27 incremental backups (cycle27). For the backup cycle types identified in table 1, the incremental backups are cumulative incremental backups. Other backup cycles which include differential incremental backups could be included in the backup cycle types. For a 24-hour window, the cycle types identified in table 1 correspond roughly to weekly, bi-weekly and monthly full backups, interspersed with cumulative incremental backups.

The status types of spare resources comprise a range of spare resource options. The status types of spare resources identified in table 1 (FIG. 3) are a particular embodiment of the spare resource options. Here, the spare resource options include: resources are ready to be used (hot); resources only need to be configured (unconfig); negotiations must be performed to release resources from other tasks and the resources must be scrubbed (occupied); resource release must be negotiated and resources must be scrubbed and configured (occUnconfig); and no spare resources are available (none).

The failure scopes considered in the exemplary embodiment are a failure of a primary disk array (array) and a site disaster at the primary storage site (site).

Parameters represent the input data, and derived parameters are computed from the input data. For the exemplary embodiment, units for parameters are indicated (e.g., US dollars ($), bytes (B), seconds (sec), or years (yr) for cost). But these values may be expressed in alternate units (e.g., gigabytes (GB) or hours (hr)) for convenience.

The parameters and derived parameters for the exemplary embodiment are described below relative to business requirements, workload, primary storage, remote mirroring, tape backup, and spare resources options.

The business requirements parameters are listed in table 2 (FIG. 4). The business requirements parameters include a target recovery time objective (targetRTO), a target recovery point objective (targetRPO), an outage penalty rate for violation of the target recovery time objective ($p^{unavail}$), and a loss penalty rate for violation of the target recovery point objective ($p^{loss}$). The target RTO (targetRTO) specifies a preferred maximum tolerable elapsed time between a failure and the point at which data is restored. In the absence of a specified outage penalty rate, the target RTO (targetRTO) becomes a requirement. In the exemplary embodiment, if no outage penalty rate is specified, it defaults to a high value which forces the solver to assign a value of zero to the recovery time allowance. In the exemplary embodiment, the recovery time allowance is also referred to as a violation of the target RTO. The target RTO (targetRTO) may range from seconds to days.

The target RPO (targetRPO) specifies a preferred maximum allowable time window for which recent updates may be lost. The target RPO (targetRPO) may range from zero (no loss is tolerable) to days or weeks. In the absence of a specified loss penalty rate, the target RPO becomes a requirement. In the exemplary embodiment, if no loss penalty rate is specified, it defaults to a high value which forces the solver to assign a value of zero to the recovery point allowance. In the exemplary embodiment, the recovery point allowance is also referred to as a violation of the target RPO.

The outage penalty rate ($p^{unavail}$) for violation of the target RTO is a specification of a cost per unit time of service interruption. The loss penalty rate ($p^{loss}$) for violation of the target RPO is a specification of a cost per unit time of updates lost. An instantiation of the formulation may use the target objectives with no penalty rates. Another instantiation of the formulation may use the target objectives in conjunction with the penalty rates. Yet another instantiation of the formulation may use the penalty rates with no target objectives.

The workload parameters are listed in table 3 (FIG. 5). The workload parameters include a workload data object capacity (wkldCapacity), an average update rate (avgUpdateRate), a short-term burst multiplier (burstMultiplier), and a unique update rate over a window duration (<$duration_w$, unique$UpdateRate_w$>). Data dependability designs are sensitive to characteristics of the storage workload. These characteristics can be measured from an existing system or estimated by a person or a tool from a repertoire of well-known workloads. Workload characteristics that do not affect the choice of data dependability solutions are ignored, as existing performance provisioning tools can be used to address these design issues. Most data protection schemes are sensitive to the average update rate (avgUpdateRate), which is the volume of updates over a given interval divided by the interval length. Synchronous mirroring solutions are also sensitive to the short-term peak-to-average burstiness of writes, which is typically 3-10× the long-term average write rate. Techniques that accumulate modifications over an interval (e.g., incremental tape backup) are more sensitive to the workload's unique update rate, the update rate after earlier updates to rewritten data have been discarded. Longer accumulation intervals allow more time for overwrites, so they often have lower unique update rates. This rate is modeled by a series of tuples of the form <interval duration, unique update rate>.

The formulation includes a derived workload parameter, which is the product of the window duration and the unique update rate. This provides the total size or capacity of a unique update of a given duration in units of bytes. This is given by:

$$uniqueCapacity_w = durations_w * unique\ UpdateRate_w$$

In the exemplary embodiment, there is a single failure parameter of likelihood of a failure (failureLikelihoodf) for a failure scope (i). Assuming that there is not a likelihood of failure of more than one incident per year, the likelihood of a failure (failureLikelihood$_f$) within a year is expressed as a fraction within the range of [0, 1].

Failures can be grouped into several threat categories including data loss and data corruption. Data loss threats cause data to be lost. These include hardware failures of the data storage devices themselves, or an encompassing failure, such as a building fire. Recently-written data is often more vulnerable to such failures because it may not have propagated to fully protected storage (e.g., it might still reside in a volatile OS buffer or it might not have propagated to a remote site yet). Data corruption threats change data into a form that cannot be used. Data corruption threats include defective software, defective firmware, and viruses. The exemplary embodiment focuses on data loss events for the primary copy such as a primary storage site disaster or failure of a primary storage disk array. Data corruption and inaccessibility threats can be mapped into loss of the primary storage copy.

In the exemplary embodiment, the primary storage comprises one or more disk arrays which store the primary copy of data using RAID 10 (striped mirrors). Disk arrays are modeled as having an upper bound on capacity (bytes) and a rate at which data can be restored (bytes/s). This formulation considers only complete failure of the primary storage array or site. It assumes that disk arrays are protected against internal single-component failures. In the exemplary embodiment, the entire dataset is protected in the same way. In another embodiment, different storage volumes may be handled differently.

The disk array cost model captures details such as the costs of the array chassis/enclosures, redundant front-end controllers (including caches), high-end array back-end controllers, and the disk drives and the trays in which they are mounted. It estimates the cost of floor space, power, cooling, and operations by using a fixed facilities cost plus a variable cost that scales with capacity. All equipment capital outlay costs are amortized over a depreciation period, which is assumed to be the lifetime of the equipment.

The disk array parameters are listed in table 4 (FIG. 6). The disk array parameters include maximum number of disks in each array (maxDisks), capacity per disk drive (diskCapacity), maximum disk array reload rate (arrayReloadBW), outlay cost of a disk array enclosure (enclosureCost), outlay cost per disk (diskCost), fixed outlay cost for facilities (fixedFacilitiesCost), variable outlay cost for facilities (varFacilitiesCost), and a period over which capital outlay costs are amortized (depreciationPeriod).

An embodiment of equations for derived disk array parameters is provided as FIG. 7. The derived disk array parameters include disk array capacity (arrayCapacity), number of disk arrays (numDiskArrays), number of disks (numDisks), and amortized outlay cost for disk arrays and facilities (primaryCost). The disk array capacity (arrayCapacity) provides the total disk array capacity in bytes. The number of disk arrays (numDiskArrays) provides the total number of disk arrays required for the primary copy of the workload. The number of disks (numDisks) provides the total number of disk required for the primary copy of the workload. The amortized outlay cost for disk arrays and facilities (primaryCost) provides the total amortized outlay cost for the primary copy disk array storage and facilities in $/yr.

The factor of two in the equations for the derived disk array parameters of the number of disk arrays (numDiskArrays), the number of disks (numDisks), and the amortized outlay cost for disk arrays and facilities (primaryCost) accounts for the RAID 10 (i.e., a mirroring technique) used in the primary storage. If a parity technique such as RAID 5 is employed in the primary storage the factor of two would be replaced by a factor of n/(n−1) where n is the number of disks per redundancy group.

The remote mirroring parameters are listed in table 5 (FIG. 8). Remote mirroring protects against loss of the primary storage by keeping an isolated copy on one or more disk arrays at a remote mirror site. In the exemplary embodiment, the remote mirror comprises a copy of the primary storage, which is a disk array storage employing RAID 10. The remote mirroring parameters include buffer size (mirrorCacheCapacity), type of asynchronous batch window (w(M)∈W(M)), link bandwidth (linkBW), upper bound on number of links (linksMax), and outlay cost per link (linkCost). The buffer size (mirrorCacheCapacity) is the size of the buffer for smoothing out write-order preserving asynchronous mirroring. The type of asynchronous batch window (w(M)∈W(M)) is the type of batch window for the batched asynchronous mirroring with write absorption.

An embodiment of equations for derived remote mirroring parameters is provided in FIGS. 9A, 9B, and 9C. FIG. 9A provides equations for derived parameters for synchronous mirroring. The derived parameters for synchronous mirroring include a lower bound for the number of network links (linksMin$_{sync}$) and a potential data loss (dataLossy$_{syncf}$) of zero. In the synchronous mirroring, the remote mirror receives and applies each write before the write completes at the primary storage. This scheme requires low latency (e.g., close proximity) between the primary and remote mirror sites to obtain good performance, but no data is lost if the primary storage fails. The lower bound for the number of network links (linksMin$_{sync}$) must support the short-term burst write bandwidth.

FIG. 9B provides equations for derived parameters for write-order preserving asynchronous mirroring. The derived parameters for write-order preserving asynchronous mirroring include a lower bound for the number of network links (linksMin$_{sync}$) and a potential data loss time period (dataLossa$_{syncf}$). The write-order preserving asynchronous mirroring propagates all primary writes (without coalescing rewrites) to the remote mirror as fast as the network links allow. Updates are applied in the same order at both sites, but updates to the remote mirror may lag. This asynchrony can improve the performance of the foreground workload beyond inter-site distances of a few tens of kilometers, but updates may be lost if the primary storage fails. The primarily storage is configured with a write buffer that is large enough to smooth the observed worst-case update bursts for the workload. As a result, the links are provisioned to support the long-term average (non-unique) update rate. Updates that have not been transferred to the remote mirror are at risk when the primary storage fails. The worst-case time window for data loss is given by the time it takes to fill or drain the write buffer, the entire contents of which may be lost upon a failure.

FIG. 9C provides equations for derived parameters for batched asynchronous mirroring with write absorption. The derived parameters for the batched asynchronous mirroring include a lower bound for the number of network links (linksMina$_{syncB,w(M)}$) and a potential data loss time period (dataLoss$_{asyncB,w(M)f}$). The batched asynchronous mirroring reduces bandwidth costs by coalescing repeated writes to the same data. Updates accumulate into batches at the primary storage and periodically propagate to the remote mirror, which applies each batch of updates atomically. Batch boundaries are declared at fixed time intervals, ranging from one minute to 24 hours. The link bandwidth must support the worst-case unique update rate over the batch interval. The potential data loss is the size of two delayed batches (one accumulating and one in transit to the secondary), so the worst-case loss window is approximated as twice the batch interval.

The tape backup parameters are listed in table 6 (FIG. 10). The tape backup parameters include tape capacity (tapeCapacity), tape drive rate (tapeDriveBW), maximum number of tape drives in a tape library (tapeDrivesMax), maximum number of tapes in a tape library (tapesMax), type of full backup windows (w(F)∈W(F)), type of incremental backup windows (w(I)∈W(I)), number of incremental backups in a cycle (cycleCount$_k$), time to retrieve tapes from offsite tape vault (RT$_{vault}$), outlay cost for tape library enclosure (tapeLibraryCost), outlay cost for a tape drive (tapeDriveCost), outlay cost for a tape cartridge (tapeCost), fixed outlay cost for tape vault (fixedVaultCost), outlay cost for a shipment to the tape vault (vaultPerShipmentCost), and number of shipments to the tape vault per year (numVaultShipments).

The outlay cost for the tape library enclosure (tapeLibraryCost) includes the cost for the chasis, media slots, and mechanism for moving tapes cartridges but does not include cost for tapes or tape drives.

Backups are modeled as occurring at fixed intervals ranging from 4 to 48 hours. Periodic full backups are optionally interspersed with cumulative incremental backups, which copy only the data modified since the last full backup. For example, backup intervals of 24 hrs with incremental cycle counts of 6, 13 or 27 days correspond roughly to weekly, bi-weekly, or monthly full backups interspersed with daily incremental backups.

An embodiment of a weekly backup cycle is schematically illustrated in FIG. 11. The backup cycle 1100 comprises a full backup 1102 and six incremental backups 1104. The full backup 1102 begins by making a snapshot 1106 of a storage volume 1108. The snapshot 1106 is a copy of the storage volume 1108 at the time that the snapshot 1106 is taken. The full backup 1102 copies the snapshot 1106 onto tapes 1110. As time proceeds, the storage volume 1108 receives updates 1111. A first incremental backup 1104A begins by making a second snapshot 1112 of the storage volume 1108. The incremental backup 1104A copies data that has changed since the snapshot 1106 for the full backup 1102 was taken onto tapes 1114.

The backup process creates a consistent, read-only snapshot of the primary data, and then uses the snapshot as the source for the backup to tape (be it full or incremental). Snapshots may be taken using space-efficient copy-on-write techniques, or by isolating a local mirror and synchronizing it with the primary copy after the backup is complete. The disk space required for a space-efficient incremental snapshot is determined from the average unique update rate and the backup interval. Each backup must finish before the next one starts, effectively defining a backup window equal to the interval duration.

An embodiment of equations for derived parameters for tape backup is provided in FIG. 12. The derived parameters for tape backup include a lower bound on the number of tape drives (tapeDrivesMin$_{k,w(F),w(I)}$), a minimum number of tape drives needed for a full backup (tapeDrivesMinFull$_{w(F)}$), a minimum number of tape drives needed for an incremental backup (tapeDrivesMinIncr$_{k,w(F),w(I)}$), a number of retained tapes (numTapes$_{k,w(F),w(I)}$), a number of tapes required for a full backup (numTapesFull), a number of tapes required for a full backup of a disk array (numTapesArrayFull), a number of tapes required for incremental backups in a cycle (numTapesIncr$_{k,w(F),w(I)}$), a number of tapes required for the largest incremental backup (numTapesMaxIncr$_{k,w(F),w(I)}$), a number of tapes required for the largest incremental backup for a disk array (numTapesArrayMaxIncr$_{k,w(F),w(I)}$), a time period for data loss for an array failure (dataLoss$_{k,w(F),w(I),array}$), and a time period for data loss for a site failure (data Loss$_{k,w(F),w(I),site}$).

The lower bound on the number of tape drives (tapeDrivesMin$_{k,w(F),w(I)}$) provides sufficient tape drives to complete each backup within its window, which is the greater of the minimum number of tape drives needed for a full backup (tapeDrivesMinFull$_{w(F)}$) and the minimum number of tape drives needed for an incremental backup (tapeDrivesMinIncr$_{k,w(F),w(I)}$).

Tapes are retained for a single full backup cycle, which includes the last full backup and all subsequent incremental backups. Each full backup is written onto a new set of tapes rather than the tapes for the previous full backup, in case it fails to complete. When a full backup completes, the tapes for the previous full backup are sent to the vault, and the tapes at the vault are recycled back to the primary site. The tapes are kept at the primary storage site until this time in case they are needed quickly to respond to operator errors. Thus, the number of retained tapes (numTapes$_{k,w(F),w(I)}$) includes four sets of full backup tapes: one set of tapes for the last full backup, one set for a new full backup (to ensure that it successfully completes without erasing the old full backup), one set of tapes for the remote tape vault, and a final set to be in transit between the local and remote sites.

The number of tapes required for all incremental backups during a cycle is calculated by summing the number of tapes used for each one. It is assumed that each backup starts on a new tape.

A primary disk array failure may destroy any backup in progress at the time of the failure, possibly losing all updates from both the current (accumulating) backup interval and the previous (propagating) backup interval. Assuming full intervals are at least as long as incremental intervals, the worst-case time period for data loss (dataLoss$_{k,w(F),w(I),array}$) is the sum of the full and incremental backup intervals.

In the event of a primary storage site disaster, the worst-case time period for data loss (dataLoss$_{k,w(F),w(I),site}$) occurs if the site is destroyed just before the new full backup completes and the old full backup is shipped offsite. In this case, the data at the vault is out-of-date by twice the full backup cycle duration, plus the interval for the latest full backup.

The parameters for the spare resources options are listed in table 7 (FIG. 13). The parameters for the spare resources options include time to identify that spare resources are available (t$_{identify}$), time to configure spare resources (t$_{configure}$), time to scrub spare resources (t$_{scrub}$), time to negotiate for spare resources (t$_{negotiate}$), outlay cost for spare disk array storage and facilities (spareCost), and discount factor for shared spare resources (spareDiscount).

An embodiment of equations for the derived parameters for the spare resources options is provided in FIG. 14. Reconstruction of the primary storage can begin as soon as the secondary data copy is available and sufficient target disk arrays are ready. If standby resources are available, reconstruction can begin nearly immediately; otherwise, resources must be found or acquired, drained if they are in use for another purpose, (re)configured if necessary, and (re)initialized (formatted). To minimize this delay, sites often keep standby equipment in various states of readiness. This formulation models a spectrum of spare resource options. In all cases, the model assumes that any spare resources are eventually replaced with new equipment, and factors this replacement cost out of the equations.

Spare resource options are modeled by the outlay cost of maintaining ready resources (either dedicated or shared) and the recovery time and corresponding financial penalties to provision those resources. One way of achieving access to spare resources is to rent access to a shared resource pool. Several companies offer such a service, which can be much cheaper than a dedicated backup site. The cost of shared resources is modeled by a fixed discount factor.

The derived parameters for the spare resources options (FIG. 14) include recovery time from hot spare resources (RT$_{hot}$), recovery time for un-configured spare resources (RT$_{uncofig}$), recovery time for occupied spare resources (RT$_{occupied}$), recovery time for occupied and un-configured spare resources (RT$_{occUnconfig}$), recovery time for no provisioned spare resources (RT$_{none}$), outlay cost for the hot spare resources (O$_{hot}$), outlay cost of the un-configured spare resources (O$_{uncofig}$), outlay cost for the occupied spare resources (O$_{occupied}$), outlay costs for the occupied and un-configured spare resources (O$_{occUnconfig}$), and outlay cost for no provisioned spare resources (O$_{none}$).

The mixed integer program employs decision variables to determine an optimal or near optimal solution. A set of binary decision variables represents the data protection alternatives and their base configurations. Each binary variable corresponds to a single protection alternative (e.g., mirroring or backup) and a specific set of discrete configuration parameters (e.g., "batched asynchronous mirroring with a write absorption interval of one minute"). Integer decision variables represent the number of bandwidth devices (e.g., network links or tape drives) for each alternative.

The remote mirroring decision variables employed in the exemplary embodiment include a set of mirroring variables for synchronous and asynchronous mirroring (x$_m$), a set of asynchronous batch mirroring variables (x$_{asyncB,w(M)}$), the number of links for synchronous and asynchronous mirroring (y$_m$), and the number of links for batched asynchronous mirroring (y$_{asyncB,w(M)}$). A more detailed description of the mirroring decision variables follow:

$$x_m = \begin{cases} 1 & \text{choose mirroring } m \in \{sync, async\} \\ 0 & \text{otherwise} \end{cases}$$

$$x_{asyncB,w(M)} = \begin{cases} 1 & \text{choose window } w(M) \in W(M) \\ 0 & \text{otherwise} \end{cases}$$

y$_m$=number of network links where m∈{sync, async} y$_{asyncB,w(M)}$=number of network links where w(M)∈W(M).

When formulated in this fashion, the recovery time models have terms that depend inversely on the number of links y (or tape drives as described below). The resulting optimization problem becomes non-linear. Although solvers exist for certain classes of non-linear optimization problems, they may take an unacceptably long time to find a solution, or fail to find one at all. Linear solvers exploit well-known theoretical results about the search space structure to solve significantly larger problems in seconds. To address this problem, the models are recast by introducing a linearization variable (z), which is the inverse of the problematic y term. A more detailed description of the linearization variable (z) follows:

z$_m$=1/y$_m$ where m∈{sync, async} z$_{asyncB,w(M)}$=1/y$_{asyncB,w(M)}$ where w(M)∈W(M)

An embodiment of equations for derived variables for the remote mirroring is provided in FIG. 15. The derived variables for the remote mirroring include a recovery time for synchronous and asynchronous mirroring upon an array failure (recoveryTime$_{m,array}$), a recovery time for synchronous and asynchronous mirroring upon a site failure (recoveryTime$_{m,site}$), a recovery time for batched asynchronous mirroring upon an array failure (recoveryTime$_{asyncB,w,array}$), and a recovery time for batched asynchronous mirroring upon a site failure (recoveryTime$_{asyncB,w,site}$). Because mirroring keeps a copy of the data constantly accessible, recovery can proceed via reconstructing the primary from the remote mirror across the network links provisioned for the remote mirroring from the primary to the remote mirror.

The tape backup decision variables employed in the exemplary embodiment include a backup policy decision variable ($x_{k,w(F),w(I)}$), a number of tape drives decision variable ($y_{k,w(F),w(I)}$), the linearization variable (z), and a number of tape libraries decision variable ($u_{k,w(F),w(I)}$). A more detailed description of the tape backup decision variables follows:

$$x_{k,w(F),w(I)} = \begin{cases} 1 & \text{choose backup policy}[k, w(F), w(I)] \\ 0 & \text{otherwise} \end{cases}$$

$$y_{k,w(F),w(I)} = \text{number of drives under backup policy}[k, w(F), w(I)]$$

$$z_{k,w(F),w(I)} = \frac{1}{y_{k,w(F),w(I)}}$$

$$u_{k,w(F),w(I)} = \text{Max}\left(\left\lceil \frac{y_{k,w(F),w(I)}}{tapeDrivesMax} \right\rceil, \left\lceil \frac{numTapes_{k,w(F),w(I)}}{tapesMax} \right\rceil \right)$$

An embodiment of equations for derived variables for the tape backup is provided in FIG. 16. The derived variables for the tape backup include a recovery time for an array failure (recoveryTime$_{k,w(F),w(I),array}$) and a recovery time for a site failure (recoveryTime$_{k,w(F),w(I),site}$). The recovery from the tape backup is a three-phase process. First, if the tapes are stored at an offsite vault, they must be retrieved to the recovery site. Second, the latest full backup is restored. And third, the latest subsequent incremental backup is restored. Vaults can be close to or far away from the target data recovery location. The largest capacity incremental backup is the last one of the cycle. To simplify the formulation, the models assume that all the tape drives in each library operate in parallel during each phase and that data is spread evenly across the tapes and drives. Tape load time is ignored because it is typically less than 5% of the time to read the tape. The worst-case recovery time is the time to retrieve the tapes from the offsite vault (in the case of a site disaster), plus the time to restore the last full and the last incremental backup of a cycle.

The exemplary embodiment employs spare resources decision variables, each of which identifies one of a range of spare resource options. A more detailed description of the spare resource variables follow:

$$x_s = \begin{cases} 1 & \text{choose spare } s \in S \\ 0 & \text{otherwise} \end{cases}$$

An embodiment of an equation for a derived variable for the spare resource options follows:

$$recoveryTime_{spare} = \sum_{s \in S} RT_s * x_s$$

The penalty decision variables employed in the exemplary embodiment include violations of the target RTO (i.e., the recovery time allowance) and violations of the target RPO (i.e., the recovery point allowance). The violations of the target RTO are a violation of the target RTO under synchronous or asynchronous mirroring $$(v_{m,f}^{RTO}),$$

a violation of the target RTO under asynchronous batched mirroring $$(v_{asyncB,w(M),f}^{RTO}),$$

and a violation of the target RTO under tape backup $$(v_{k,w(F),w(I),f}^{RTO}).$$

The violations of the target RPO are a violation of the target RPO under synchronous or asynchronous mirroring $$(v_{m,f}^{RPO}),$$

a violation of the target RPO under asynchronous batched mirroring $$(v_{asyncB,w(M),f}^{RPO}),$$

and a violation of the target RPO under tape backup $$(v_{k,w(F),w(I),f}^{RPO}).$$

An embodiment of equations for derived variables for penalty costs is provided in FIG. 17. The derived variables for penalty costs include a penalty cost for violation of the target RTO ($P^{unavail}$) and a penalty cost for violation of the target RPO ($P^{loss}$).

An embodiment of equations for derived variables for outlay costs is provided in FIG. 18. The derived variables for the outlay costs include a remote mirror outlay cost ($O^{mirror}$), a tape backup outlay cost ($O^{backup}$), and a spare resources outlay cost ($O^{spare}$).

The objective comprises minimizing overall annual business cost, defined as outlay costs plus penalty costs for primary copy failures. A more detailed description of the objective follows:

$$\text{Min } (O^{array} + O^{mirror} + O^{backup} + O^{spare} + P^{unavail} + P^{loss})$$

An embodiment of equations for the constraints employed in the exemplary embodiment is provided in FIGS. 19A and 19B. The constraints comprise a secondary storage selection constraint 1902, a spare resources selection constraint 1904, bandwidth constraints 1906, reload constraints 1908, recovery time constraints 1910, recovery point constraints 1912, and linearization constraints 1914.

The secondary storage selection constraint 1902 ensures that one and only one secondary storage system is selected (i.e., a particular remote mirroring configuration or a particular tape backup configuration). The spare resources selection constraint 1904 ensures that one and only one spare resource option is selected. The bandwidth constraints 1906 ensure that a sufficient number of network links or tape drives, tapes, and tape libraries ($u_{k,w(F),w(I)}$) are provisioned for a selected secondary storage configuration. The reload constraints 1908 ensure that the bandwidth for reload does not exceed an upper limit on reload rate for the primary storage.

The recovery time constraints 1910 ensure that the recovery time minus the violation of the target RTO (i.e., the recovery time allowance) does not exceed the target RTO. The recovery point constraints 1912 ensure that the time period for data loss minus the violation of the target RPO (i.e., the recovery point allowance) does not exceed the target RPO. Note that the value of C in the recovery time constraints 1910 is sufficiently large to ensure that particular constraints that are not relevant to a particular secondary storage system under consideration do not constrain the solution.

The linearization constraints 1914 impose a linearization on the z variables, which improves a solution response time. The linearization constraints use a decision variable $\lambda''$ which is constrained to be an SOS2 (special ordered set of type 2) variable. SOS2 variables allow no more than two consecutive variables from the set of variables to take non-zero values. Most commercial solvers for mathematical programs enable SOS2 variable functionality.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of designing a storage system comprising:
   assigning decision variables to a range of candidate storage systems, each of the decision variables identifying a single candidate storage system; and
   employing, by a computer, the decision variables in a mathematical program to determine which of the candidate storage systems meets availability and reliability criteria and incurs a near minimal projected cost, wherein the availability criterion is a measure of an ability to access data when desired, and the reliability criterion is one of a measure of absence of data loss and an indicator of an acceptable amount of data loss.

2. The method of claim 1 wherein the near minimal projected cost comprises a minimal projected cost.

3. The method of claim 1 wherein each of the candidate storage systems comprises a primary storage and a secondary storage, wherein the mathematical program has input values specifying different types of the secondary storage.

4. The method of claim 3 wherein the secondary storage is selected from a range of remote mirror configurations.

5. The method of claim 4 wherein each of the range of remote mirror configurations comprises secondary disk storage and a network bandwidth between the primary storage and the secondary disk storage.

6. The method of claim 5 wherein at least some of the range of remote mirror configurations further comprise window durations for batched asynchronous mirroring.

7. The method of claim 3 wherein the secondary storage is selected from a range of backup configurations.

8. The method of claim 7 wherein at least some of the range of backup configurations comprise local backups with a remote vault component.

9. The method of claim 7 wherein at least some of the backup configurations each comprise full backups.

10. The method of claim 7 wherein at least some of the backup configurations include incremental backups.

11. The method of claim 7 wherein at least some of the backup configurations comprise a quantity of tape drives and a quantity of tapes.

12. The method of claim 11 wherein at least some of the backup configurations comprise one or more tape libraries.

13. The method of claim 3 wherein the secondary storage is selected from a range of remote mirror configurations and backup configurations.

14. The method of claim 1 wherein the availability and reliability criteria comprise a recovery time objective and a recovery point objective, respectively.

15. The method of claim 1 wherein the mathematical program comprises a mixed integer program which comprises constraints and an objective, and wherein the mixed integer program comprises integer variables and continuous variables.

16. The method of claim 15 wherein the constraints comprise:
   selecting one and only one of the candidate storage systems, thereby selecting a particular candidate storage system;
   selecting one and only one spare resource option;
   satisfying a bandwidth constraint;
   satisfying a reload constraint;
   satisfying a recovery time constraint; and
   satisfying a recovery point constraint.

17. The method of claim 16 wherein the objective comprises minimizing an outlay cost.

18. The method of claim 16 wherein the objective comprises minimizing a sum of an outlay cost and a penalty cost.

19. The method of claim 17 wherein the outlay cost comprises a sum of costs for a secondary storage and the spare resource option.

20. The method of claim 17 further comprising the step of iteratively instantiating the mathematical program to map at least a portion of a solution space.

21. The method of claim 19 wherein the sum of costs further comprises a cost for a primary storage.

22. The method of claim 19 wherein the secondary storage comprises a remote mirror.

23. The method of claim 19 wherein the secondary storage comprise: a backup configuration.

24. The method of claim 23 wherein the backup configuration comprises a tape backup.

25. The method of claim 24 wherein the bandwidth constraint comprises ensuring that a quantity of tape drives and a quantity of available tapes satisfy a storage workload.

26. The method of claim 21 wherein the primary storage comprises one or more disk arrays.

27. A method of designing a storage system comprising:
   assigning decision variables to a range of candidate storage systems, each of the decision variables identifying a single candidate storage system; and
   employing, by a computer, the decision variables in a mathematical program to determine which of the candidate storage systems meets availability and reliability criteria and incurs a near minimal projected cost,
   wherein the mathematical program comprises a mixed integer program which comprises constraints and an objective, wherein the constraints comprise:
selecting one and only one of the candidate storage systems, thereby selecting a particular candidate storage system,
selecting one and only one spare resource option,
satisfying a bandwidth constraint,
satisfying a reload constraint,
satisfying a recovery time constraint, and
satisfying a recovery point constraint,
wherein the objective comprises minimizing an outlay cost, wherein the outlay cost comprises a sum of costs for a secondary storage and the spare resource option, wherein the secondary storage comprises a remote mirror, and
wherein the bandwidth constraint comprises ensuring that a quantity of network links between a primary storage and the secondary storage satisfies a storage workload.

28. The method of claim 27 wherein the reload constraint ensures that a bandwidth for the quantity of network links between the primary storage and the secondary storage does not exceed a reload rate for the primary storage.

29. A method of designing a storage system comprising:
assigning decision variables to a range of candidate storage systems, each of the decision variables identifying a single candidate storage system; and
employing, by a computer, the decision variables in a mathematical program to determine which of the candidate storage systems meets availability and reliability criteria and incurs a near minimal projected cost,
wherein the mathematical program comprises a mixed integer program which comprises constraints and an objective,
wherein the constraints comprise:
selecting one and only one of the candidate storage systems, thereby selecting a particular candidate storage system,
selecting one and only one spare resource option,
satisfying a bandwidth constraint,
satisfying a reload constraint,
satisfying a recovery time constraint, and
satisfying a recovery point constraint,
wherein the objective comprises minimizing an outlay cost, wherein the outlay cost comprises a sum of costs for a secondary storage and the spare resource option. wherein the secondary storage comprises a backup configuration, wherein the backup configuration comprises a tape backup,
wherein the bandwidth constraint comprises ensuring that a quantity of tape drives and a quantity of available tapes satisfy a storage workload, and
wherein the reload constraint ensures that a bandwidth for the quantity of tape drives does not exceed a reload rate for a primary storage.

30. A method of designing a storage system comprising:
assigning decision variables to a range of candidate storage systems, each of the decision variables identifying a single candidate storage system; and
employing, by a computer, the decision variables in a mathematical program to determine which of the candidate storage systems meets availability and reliability criteria and incurs a near minimal projected cost,
wherein the mathematical program comprises a mixed integer program which comprises constraints and an objective,
wherein the constraints comprise:
selecting one and only one of the candidate storage systems, thereby selecting a particular candidate storage system,
selecting one and only one spare resource option,
satisfying a bandwidth constraint,
satisfying a reload constraint,
satisfying a recovery time constraint, and
satisfying a recovery point constraint,
wherein the objective comprises minimizing a sum of an outlay cost and a penalty cost, and
wherein the recovery time constraint comprises ensuring that a recovery time minus a recovery time allowance does not exceed a recovery time objective.

31. The method of claim 30 wherein the recovery point constraint comprises ensuring that a recovery point minus a recovery point allowance does not exceed a recovery point objective.

32. The method of claim 31 wherein the penalty cost comprises a penalty rate function.

33. The method of claim 31 wherein the penalty cost comprises a likelihood of failure times a sum of a recovery time penalty rate times the recovery time allowance and a recovery point penalty rate times the recovery point allowance.

34. The method of claim 31 wherein the penalty cost comprises a sum of a recovery time penalty rate times the recovery time allowance and a recovery point penalty rate times the recovery point allowance.

35. The method of claim 31 wherein the recovery time objective is set to zero or the recovery point objective is set to zero or both the recovery time objective and the recovery point objective are set to zero in an instantiation of the method of designing the storage system.

36. A method of designing a storage system comprising:
assigning a decision variable to each of a range of candidate storage systems; and
employing, by a computer, the decision variables in a mixed integer program which
comprises an objective and constraints, the objective comprises minimizing a projected cost and the constraints comprise:
selecting one the candidate storage systems, thereby selecting a particular candidate storage system;
satisfying a bandwidth constraint;
satisfying a recovery time constraint, wherein the recovery time constraint specifies a time period for recovery from a failure; and
satisfying a recovery point constraint, wherein the recovery point constraint specifies a worst case time period for data loss.

37. The method of claim 36 wherein the projected cost comprises an outlay cost.

38. The method of claim 37 wherein the projected cost further comprises a penalty cost.

39. The method of claim 36, wherein the mixed integer program has inputs related to failure scenarios that include a scope of failure and a failure likelihood.

40. A computer readable media comprising computer code that upon execution by a computer implements a method of designing a storage system, the method of designing the storage system comprising:
assigning a decision variable to each of a range of candidate storage systems; and
employing the decision variables in a mathematical program to determine which of the candidate storage systems meets availability and reliability criteria and incurs a near minimal projected cost, wherein the availability criterion is a measure of an ability to access data when desired, and the reliability criterion is one of a measure of absence of data loss and an indicator of an acceptable amount of data loss.

41. A computer readable media comprising computer code that upon execution by a computer implements a method of designing a storage system, the method of designing the storage system comprising:

assigning a decision variable to each of a range of candidate storage systems; and employing the decision variables in a mixed integer program which comprises an objective and constraints, the objective comprises minimizing a projected cost and the constraints comprise:

selecting one of the candidate storage systems, thereby selecting a particular candidate storage system;

satisfying a bandwidth constraint;

satisfying a recovery time constraint, wherein the recovery time constraint specifies a time period for recovery from a failure; and satisfying a recovery point constraint, wherein the recovery point constraint specifies a worst case time period for data loss.

* * * * *

UNITED STATES PATENT AND TRADEMARK OFFICE
CERTIFICATE OF CORRECTION

PATENT NO. : 7,644,249 B2 Page 1 of 1
APPLICATION NO. : 10/943732
DATED : January 5, 2010
INVENTOR(S) : Kimberly Keeton et al.

It is certified that error appears in the above-identified patent and that said Letters Patent is hereby corrected as shown below:

In column 20, line 49, in Claim 23, delete "comprise:" and insert -- comprises --, therefor.

In column 21, line 46, in Claim 29, delete "option." and insert -- option, --, therefor.

In column 22, line 42, in Claim 36, delete "one the" and insert -- one of the --, therefor.

Signed and Sealed this

Sixth Day of July, 2010

David J. Kappos
*Director of the United States Patent and Trademark Office*